Aug. 4, 1964  P. E. DEHRING ETAL  3,143,380
MOBILE SILO HOPPER
Filed July 31, 1962  3 Sheets-Sheet 1
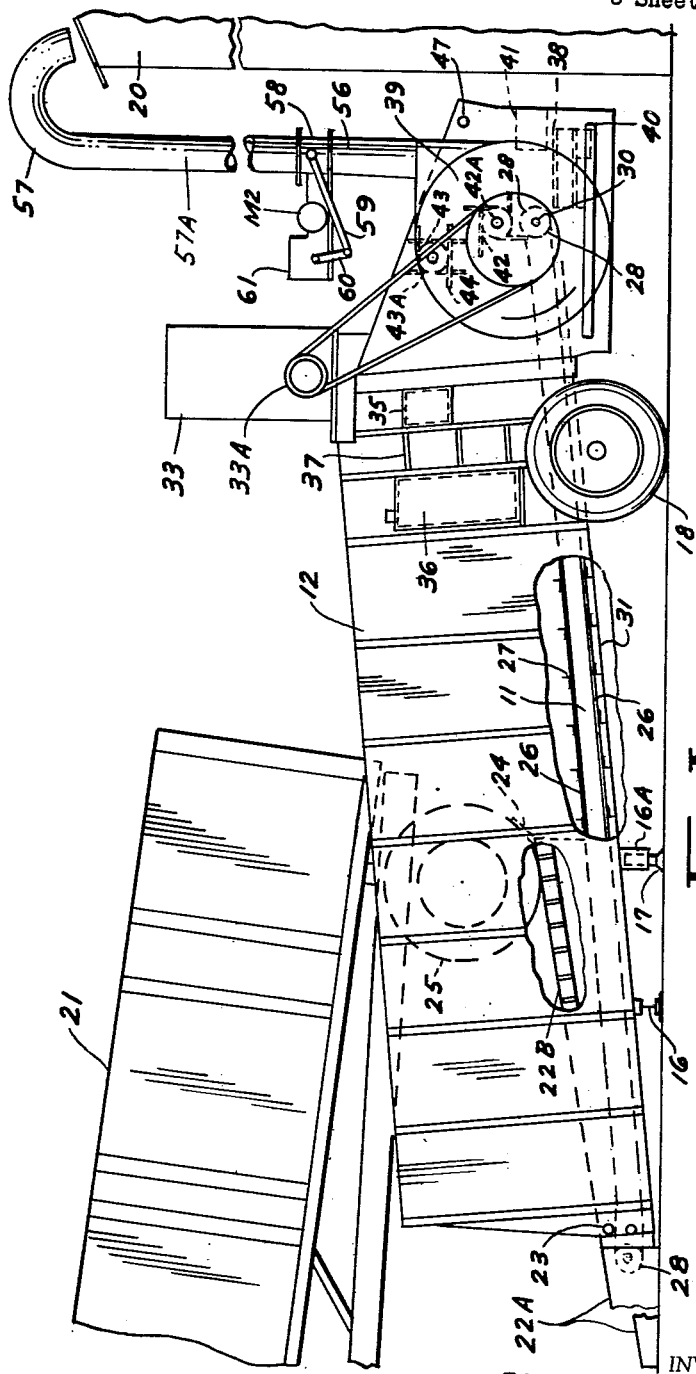
Fig. I
INVENTORS
PAUL E. DEHRING
JOHN M. BURDICK
BY
Edward M. Apple
ATTORNEY

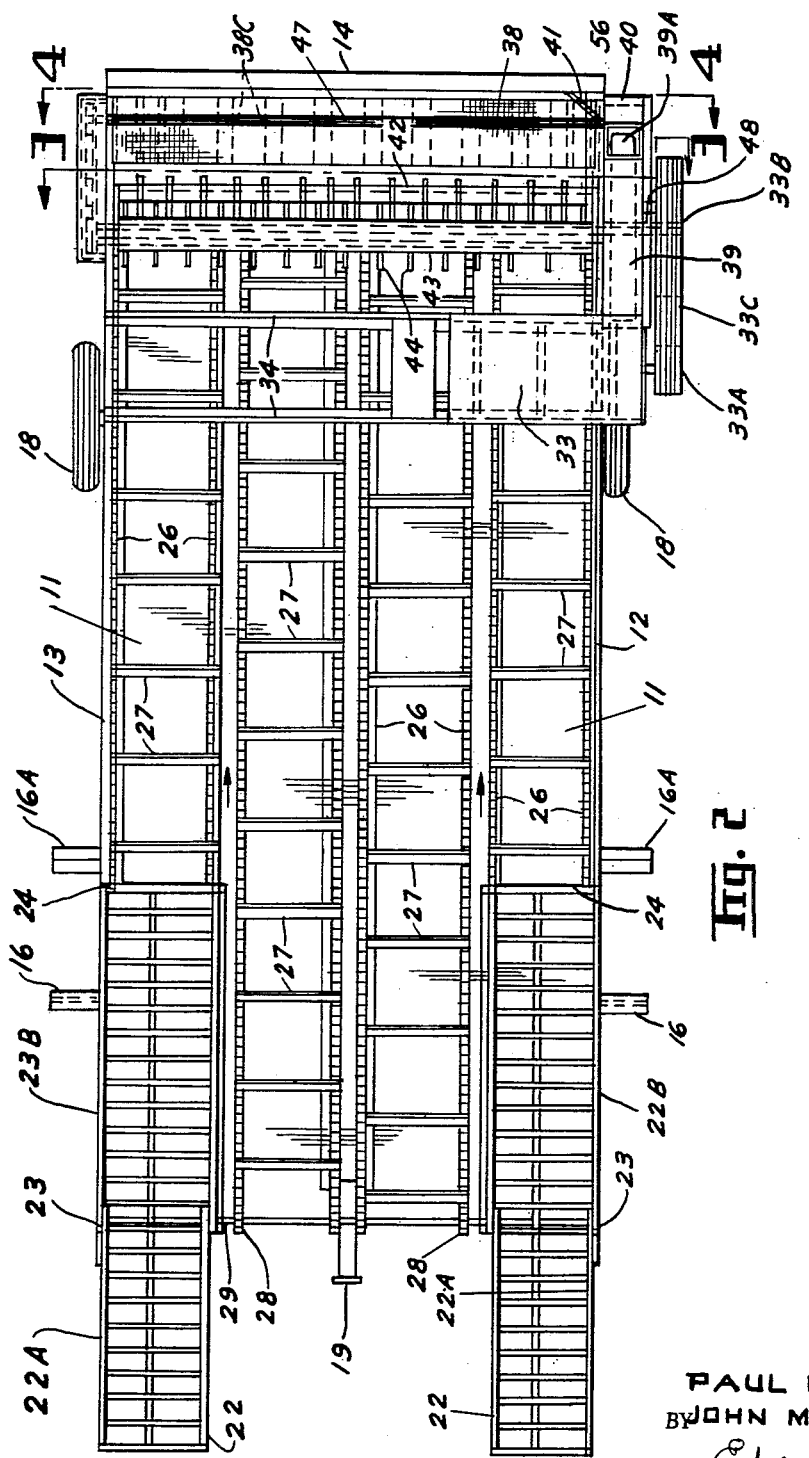

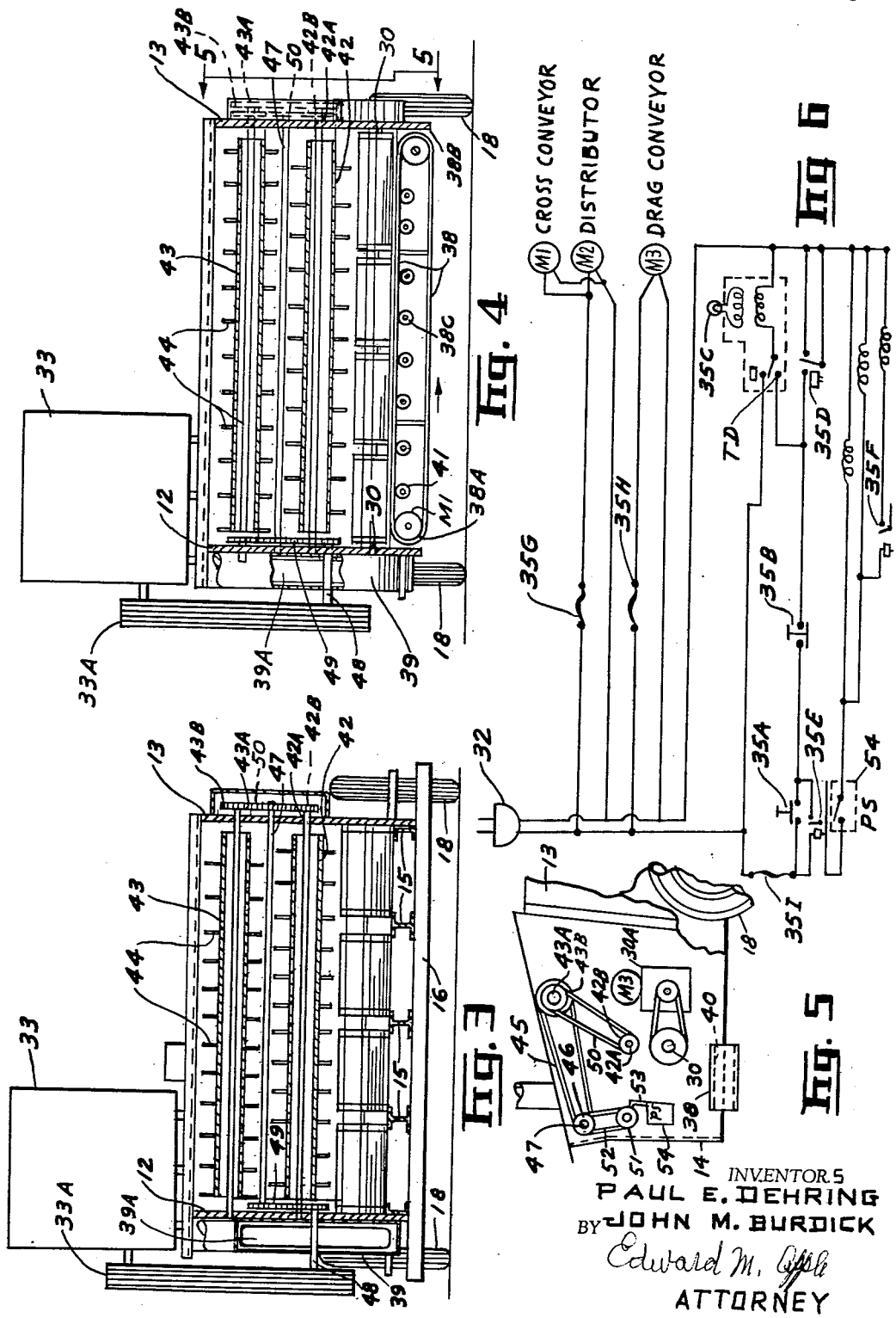

United States Patent Office 3,143,380
Patented Aug. 4, 1964

3,143,380
MOBILE SILO HOPPER
Paul E. Dehring, Rte. 1, Box 41, Armada, Mich., and John M. Burdick, 61380 Haven Ridge Road, New Haven, Mich.
Filed July 31, 1962, Ser. No. 213,744
9 Claims. (Cl. 302—37)

This invention relates to agricultural implements and has particular reference to a device for loading silos.

An object of the invention is to provide a mobile silo hopper with means to provide a continuous flow of forage into the silo, thereby cutting the actual filling time of a conventional silo from weeks to hours, thus assuring the highest and most uniform quality of feed throughout the silo.

It is the present practice to provide an independent blower unit which is usually driven by the engine of a tractor which, during the loading operation, it is made unavailable for hauling or other purposes. In addition, a number of self-unloading wagons, each pulled by a separate tractor, is required. Each individual tractor and wagon requires the service of at least one man. Upon arrival at the silo with a load of forage, each wagon must be maneuvered into position for alignment with the blower. During the maneuvering of the wagon into and out of loading position with the blower, the blower runs empty thereby washing fuel and tying up equipment.

Under the present system, a minimum of three wagons and tractors and corresponding manpower must be employed, so that while one wagon is being filled in the field, one is in transit and one is unloading at the blower. If the production fields are removed from the silo a greater distance than a one-half mile, additional wagons and tractors are required to fill in the time lost in transit, in order to present even a semblance of continuity.

It is therefore an object of this invention to obviate the foregoing difficulties and to provide a device which permits the efficient and economical use of large forage harvesting equipment and large trucks, each of which can carry a minimum of twice the load of a conventional wagon, at twice to four times the speed and with no delay at the silo, with the result that the manpower needed is greatly reduced, the cost of filling the silo is correspondingly reduced, and the overall efficiency of the operation is greatly improved.

Another object of the invention is to provide a device of the character indicated which is simple in construction, economical to manufacture and efficient in operation.

A further object of the invention is to provide a device which may be employed for custom loading of silos on a commercial basis, because of its portability and its unique construction and functioning.

A further object of the invention is to provide a device of the character indicated, which is constructed and arranged so that large, fast dump trucks may dump forage into it from an integrated ramp, with means to provide a continuous feeding of the forage to the blower during a continuous working period of the blower.

Another object of the invention is to provide means for loading a silo, whereby forage may be received from a dump truck and may then be moved to the blower and hence into the silo after the truck has been removed and while the said truck is in transportation back to the field for a new load.

Another object of the invention is to provide a silo loading mechanism which may be operated on a continuous load cycle, with novel control means for preventing overloading and novel control means for rendering certain parts inoperative when other parts are not operating at regular capacity.

Another object of the invention is to provide a portable loading device for a silo which may be transported to a filling site and may be set up for full capacity operation in a very limited time.

Another object of the invention is to provide a device of the character indicated, which is substantially self-contained so that a silo may be filled in a comparatively short time with a minimum number of pieces of auxiliary equipment and manpower.

The foregoing and other objects and the advantages of the invention will become more apparent as the description proceeds, reference being made from time to time to the accompanying drawing, forming part of the within disclosure in which drawing:

FIG. 1, is a side elevational view, with parts broken away, of a device embodying the invention, shown in position for loading a silo and showing a dump truck in unloading position on the device.

FIG. 2, is a top plan view, with parts in section, of the device shown in FIG. 1 with the truck and silo removed.

FIG. 3, is a section taken substantially on the line 3—3 of FIG. 2.

FIG. 4, is a section taken substantially on the line 4—4 of FIG. 2.

FIG. 5, is a reduced fragmentary elevational detail taken substantially on the line 5—5 of FIG. 4, with the cover removed.

FIG. 6, is a diagrammatical view of the electrical circuits employed with the device.

Referring now more particularly to the drawings, it will be understood that in the embodiment herein disclosed the reference character 11 indicates the bed and the reference characters 12 and 13 the sidewalls and the reference character 14 indicates the rear end wall of the loader, which elements are made of suitable gauge metal and are secured together by any suitable means. The bed 11 is suitably reinforced with longitudinal members 15 and cross members 16 and 16A, the latter being provided with jack members 17, so that the bed may be elevated for transportation on the wheels 18. We provide a special dolly (not shown) which supports the front end of the device when being transported. The tongue 19 rests on top of the dolly and is secured thereto by any suitable means, so that the assembly may be attached to a tractor or truck for towing from place to place.

In FIG. 1, we show the device moved into position for loading a silo 20 with silage hauled from the field in a truck 21, which has been backed onto the ramp 22 of the device as is described more fully hereinafter. The ramp 22 is preferably made of left and right track sections, each section of which is made of two parts 22A and 22B which are pivoted together, as at 23, so that the parts 22A may be superimposed on parts 22B when the loader is to be transported. The members 22B are provided with stops 24 so that the rearward movement of the wheels 25 of the truck 21 may be limited, and so that the contents of the truck 21 may be dumped well into the interior of the device. The members 22B are supported in spaced relation to the bed 11 by any suitable means. Extending around and from front to rear of the bed 11 are pairs of drag chains 26, which are provided with spaced angle members 27 connecting the chains of each pair to form parallel drag-type conveyors. The chains 26 pass over sprockets 28 carried at each end of the bed 11 on shafts 29 and 30 and move in the direction shown by the arrows in FIG. 2. The chains 26 are supported beneath the bed 11 by suitable guide members 31 (FIG. 1). The shaft 30 is driven through a gear reduction 30A by means of an electric motor M3 (FIGS. 5 and 6) which is connected into the electric circuits as shown in FIG. 6. Electric power is provided to the circuits through the plug 32 (FIG. 6) which may be connected to a conventional 110 volt power source, or to a power generator (not shown), which may be driven by the Diesel engine 33, which is mounted on suitable supports 34 carried on top of the side walls 12 and 13. The engine 33 is provided with a clutch (not shown). The electrical circuits are connected to a suitable control panel which is housed in the box 35 and contains a normally open start button 35A, a normally closed stop switch 35B, a "power on" light 35C, two relays 35D and 35E, a timer delay relay 35F and fuses 35G, 35H and 35I. A fuel tank 36 is provided for the Diesel engine and a ladder 37 is provided so that the engine may be reached for maintenance and repairs.

Adjacent the rear ends of the drag conveyors 26 is a transverse conveyor 38, which is in the form of an endless belt, supported at either end by rollers 38A and 38B, and supported in the center by a plurality of rollers 38C which rotate freely on suitable shafts carried by the end plate 14 and a cross member (not shown). The roller 38A is driven by an electric motor M1, which also is electrically connected in the circuits as shown in FIG. 6. The transverse conveyor 38 receives silage from the drag conveyors 26 and transports it laterally to a blower or impeller 39, which is mounted on a suitable bracket 40 carried on the side wall 12. The blower 39 is driven by the Diesel engine 33 through pulleys 33A and 33B and belts 33C. The silage is partly guided into the blower inlet by means of a baffle 41, which is mounted on the end plate 14, and overlies a portion of said transverse belt. The member 41 serves to re-direct a portion of the silage carried on the transverse conveyor 38 and prevents air build-up and prevents the device from jamming at that point.

Before the silage is deposited on the transverse conveyor 38 it is worked upon and finely broken up by a pair of beaters 42 and 43, which are substantially rectangular box-like structures with radiating fingers 44. The beater members 42 and 43 aid in moving the silage and preferably rotate in the same direction but in the direction opposite to the rotation of the blower 39 and are driven by the longitudinal shafts 42A and 43A which are suitably journaled in the side members 12 and 13. The shaft 43A is driven by a chain 45 (FIG. 5) which is driven by a sprocket 46 mounted at the end of a transverse shaft 47 which also is journaled in the side walls 12 and 13. The shaft 47 is driven by an extension of the blower shaft 48 through suitable sprockets and chain 49 which are positioned along the inside of the side wall 12, whereby said beaters and said blower are always driven at the same relative speed whereby to help prevent overloading of the blower. The shaft 43A drives the shaft 42A through sprockets 43B and 42B and a chain 50 (FIG. 5). A fluid pump 51 is also driven by the shaft 47 through suitable sprockets and chain 52 and the pump 51 is connected, as at 53, to a pressure switch 54 (FIGS. 5 and 6) which controls the circuits to the motors M1, M2 and M3, so that the motors M1, M2 and M3 will cut out if the r.p.m.'s of the shaft 47 fall below a given speed; for example if the Diesel engine 33 should become overloaded. This is an important feature of the invention as it provides a safety factor to prevent the breakage of working parts and the burning out of the electric motors.

After the beaters 42 and 43 break up the silage they help to move the silage toward the rear where it falls on the conveyor 38 and is moved into the blower 39. The end plate 14 is inclined so that any silage striking it will fall onto the conveyor 38. As the silage is received in the blower 39 it is picked up by the rotating paddle wheel 39A of the blower and impelled upwardly into the blower pipe 56 (FIG. 1) and thence into the silo 20 through the distributor head 57. The head 57 and its stand pipe connection 57A are arranged to rotate about a vertical axis through a sufficient arc to properly distribute the silage evenly throughout the silo 20. The rotation of the stand pipe 56 and head 57 is accomplished by means of the collar 58, the lever 59 and the crank 60 which is driven through a gear reduction 61 by the motor M2, which is also connected in the circuits as shown in FIG. 6 and is controlled as are the other motors M1 and M3 by the pressure switch 54.

In the operation of the device it is first transported to the location and setup as shown in FIG. 1 beside the silo and connected to the source of electrical power and after a loaded truck 21 is backed onto the ramp 22 and unloaded, or while unloading the truck 21, the normally open start button 35A is pressed, permitting electrical energy to flow to the relay 35D which turns on the signal light 35C indicating that power is available. After the Diesel engine 33 is started and the clutch is engaged to drive the blower 39 and the blower 39 and beaters 42 and 43 are up to proper speed, the pressure switch 54 is closed. This energizes the motor starting relay 35F to start the motors M1 and M2. The time delay relay TD is next energized starting the motor M3 which drives the drag conveyors 26 causing the silage to be moved to the beaters 42 and 43, then to the conveyor 38 and into the blower 39 and hence upwardly and into the silo 20. Should the speed of the blower 39 fall below minimum blowing speed the pressure switch 54 will open, thereby cutting off the power to the electric motors and when the blower regains its proper speed the switch 54 will close, causing the electric motors again to be energized to drive the conveyors and the distributor.

As one truck 21 is emptied another one can take its place for unloading. There is no truck delay encountered and the machine can be run continuously as long as the silage keeps coming from the field.

It is believed that the operation of the device is obvious from the foregoing description.

Having described our invention, what we claim and desire to secure by Letters Patent is:

1. A portable and self-contained loader for use with a silo, comprising a bed having supporting wheels, side walls and an end wall, a loading ramp at the end of said bed opposite said end wall arranged to receive a truck or the like, drag-type conveyors moveable over said bed in the direction away from said ramp, a transverse conveyor belt at the end of said bed adjacent said end wall, a blower mounted on one of said side wall and having an intake opening in alignment with said transverse belt, an exhaust opening in said blower, a conduit in communication with said exhaust opening and the interior of said silo, and means mounted on said bed to drive said conveyors, means mounted on said bed to drive said transverse belt and means mounted on said bed to drive said blower.

2. The structure of claim 1, including a pair of rotatable beater members positioned parallel to said transverse belt, and above said drag conveyor, and arranged to finely break up material moved along said bed by said drag conveyors, and means supported by said bed to drive said beater members.

3. The structure of claim 1, in which said ramp is divided into two tracks, each of which is formed of two hinged sections, one of which sections of each track, is supported above and extends over a portion of said bed, and the other of said sections of each track being arranged to swing over the first section and rest thereon during transportation of said bed from place to place.

4. The structure of claim 1, including means for attaching said bed to a transporting vehicle and means for supporting the ramp end of said bed when not being transported.

5. The structure of claim 1, in which said blower is driven by an engine which is supported by the side walls of said bed, there being a pair of rotatable beater members journaled in said side walls, said beater members being driven through linkage connected to the drive shaft of said blower, whereby said beaters and said blower are always driven at the same relative speeds.

6. The structure of claim 1, in which the means to drive said drag conveyors and the means to drive said transverse belt consist of electric motors which are positioned in electric circuits which in turn are controlled by means which are responsive to the speed of said blower driving means.

7. The structure of claim 1, including a baffle positioned adjacent the intake opening of said blower and overlying a portion of said transverse belt which redirects portions of the material carried by said transverse belt prior to the entry of the material into said intake opening.

8. The structure of claim 1, including means supported by said bed and responsive to the blower control and material handling control for rotating said conduit about its longitudinal axis during the operation of said blower.

9. The structure of claim 1, including a rotatable distribution head with conduit means connected to the exhaust opening of said blower and an electric motor for driving said distribution head, said motor being in electric circuits connected to the means for driving at least one of said conveyors, which said circuits are controlled by a device responsive to the speed of said blower.

References Cited in the file of this patent

UNITED STATES PATENTS

| | | |
|---|---|---|
| 2,464,973 | Freiden | Mar. 22, 1949 |
| 2,630,351 | Hausen | Mar. 3, 1953 |
| 2,752,204 | Broughton | June 26, 1956 |
| 2,931,485 | Stoddard | Apr. 5, 1960 |